Nov. 3, 1931.  H. HOLLERITH  1,830,699
AUTOMATIC CONTROL FOR TABULATING MACHINES
Filed March 11, 1914  4 Sheets-Sheet 3

Witnesses
W. A. Williams
Francis P. Maguire

Inventor
Herman Hollerith
By
Attorney

Patented Nov. 3, 1931

1,830,699

UNITED STATES PATENT OFFICE

HERMAN HOLLERITH, OF WASHINGTON, DISTRICT OF COLUMBIA, ASSIGNOR TO THE TABULATING MACHINE COMPANY, OF EAST ORANGE, NEW JERSEY, A CORPORATION OF NEW JERSEY

AUTOMATIC CONTROL FOR TABULATING MACHINES

Application filed March 11, 1914. Serial No. 824,015.

The object of this invention is to provide means for automatically controlling registering and other apparatus used in the Hollerith tabulating system in which, as is well known, is employed a record-card having index-points, preferably punched holes, which are located on each particular record-card in accordance with the data which that card represents. The system comprises, among other things, apparatus for registering the items constituting the record formed on each record-card and totalizing or integrating the items of any one or more columns of the record-cards, and also apparatus for sorting or classifying the record-cards into different series.

After the record-cards have been sorted or classified according to a particular class, it is frequently desirable or necessary to totalize or integrate the record represented by the index-points in a corresponding group of all classified record-cards composing several different series of sorted or classified record-cards in the apparatus.

By my present invention I automatically detect a change in a record group of cards, the apparatus, in the form shown herein, being controlled or stopped at the termination of the totalizing or integration of each series or group of sorted or classified record-cards and before a second series of record-cards is brought into controlling relation to the apparatus.

In Letters Patent No. 1,087,061, issued to me February 10, 1914, I showed means for accomplishing this purpose with the aid of stop-cards located between the different series of record-cards, the stop-cards when brought into control position allowing the apparatus to automatically stop. According to my present invention the same result is effected by the record-cards themselves (i. e. the cards upon which the data being tabulated is recorded), without the use of stop cards.

Electricity is the agent preferably employed for effecting the control or operation of the apparatus but it is not my intention to restrict my invention to the employment of that particular operating or controlling agent since other equivalent means may be employed instead of an electric circuit or circuits and electrically operated devices hereinafter described; but I consider electricity to be the most advantageous agent and have therefore selected, for the purpose of description, an electrically-operated apparatus, but it is to be understood that I do not intend to exclude from the scope of this invention apparatus in which some or all of the devices are operated mechanically instead of electrically, and further where the apparatus is operated electrically, either open or closed circuits may be employed.

In the accompanying drawings.

Figure 6:
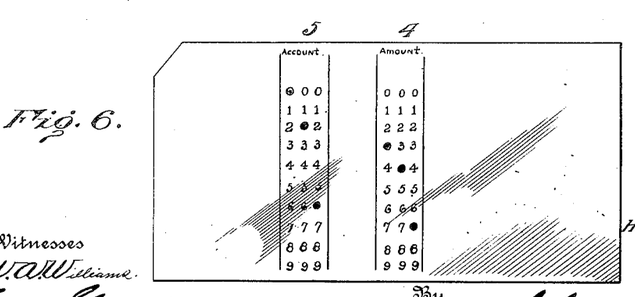
Fig. 6 is a face view of a record-card.

In the form of record-card which I have selected for the purpose of illustrating and describing my invention, but without intending to limit my invention thereto, the index-point positions, as shown in Fig. 6, are denoted by printed figures arranged in groups, each group consisting of one or more columns of figures comprising the nine digits and the cipher, substantially as shown in my U. S. Letters Patent No. 677,214 and No. 777,209, with the cipher at the top of each column in horizontal alinement and the digits following in order down each column to the figure 9. As in my before noted Patent No. 1,087,061, I have shown only two groups, each consisting of three columns of index-point positions, but in actual practice the record-card may contain any desired number of different groups, and each group may embody several columns of index-point positions, but this theoretical form of record will enable the principle of my invention to be readily understood.

Figure 4:
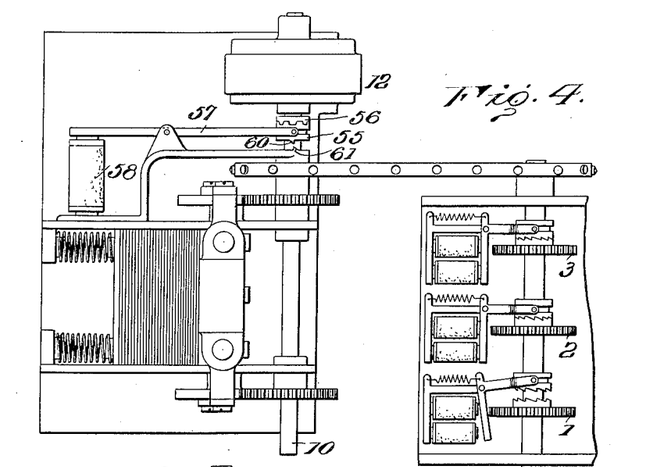
Fig. 4 is a plan view of the parts shown in Fig. 3.

There may be any desired number of registers, each controlled by the index-points in its respective group of the record-cards, but the present invention will be described first in reference to a single registering apparatus, registering gears of a typical form of which are shown at 1, 2 and 3 (Fig. 4); but their number may, of course, be varied as desired. Any desired form of registering apparatus embodying directly actuated registering members with means for carrying or transferring from one member to that of the next higher order, accumulating members and zero resetting devices may be employed, and I have therefore not considered it necessary to illustrate or describe the same in detail since their construction and operation are well known in the art. According to the record-card shown by way of illustration the registering device will be controlled by the index-points in group 4, which for present purposes, and solely for enabling the invention to be readily understood, may be regarded as representing the "amount" of a particular record, while the index-points in group 5 may be considered as representing the "account" number against which the amount may be chargeable.

Assuming that the record-cards of a given "account" number have been sorted, or, more properly speaking, that the record-cards of several different accounts have been sorted and classified, and properly positioned in the apparatus to enable the record represented by the index-points in the "amount" group of each series to be totalized or integrated, according to my present invention, the tabulation will be automatically stopped after the last record-card of each series has passed from its control position and the record represented thereby has been indicated by the registering wheels.

The different series of record-cards 6, stacked together, ready to be fed to the apparatus, are placed on edge upon a platform 7, (Fig. 3) and are fed therefrom, one by one, by a reciprocating cross-head 8 and feed-rollers 9 in gear with each other and with the main operating shaft 10 which is designed to be rotated by motor 12. Operating with the feed-rollers 9 are two lower sets of feed-rollers, 13 and 14, on different horizontal planes, and beneath the rollers 14 I have shown a receptacle 15 into which the cards may be discharged after passing through the machine. The cross-head is reciprocated by connecting rods 16 which are actuated in synchronism with the feed-rollers. As is well-known, according to the Hollerith system each record-card in its passage through the apparatus is brought into position to control record-actuated contacts through which the registering devices are controlled, and preferably such contacts consist of conducting brushes and contact plates which are actuated, or permitted to come together and move apart, by the record.

Figure 5:
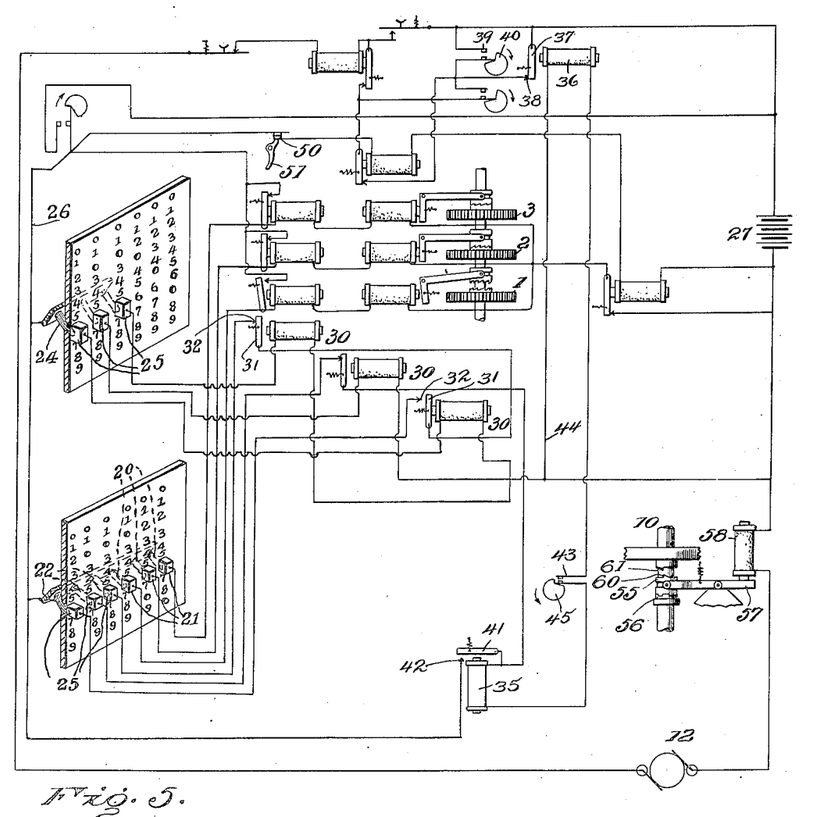
Fig. 5 is a diagrammatic plan view of a portion of a tabulator with my present improvements added.

In Fig. 5 I have shown three brushes 20 and three contact plates 21 to which the index-point positions of the respective columns of group 4, in the selected illustration, are successively presented, and when a punched hole in a column registers with a brush of that column the brush will engage its respective contact and an electrical circuit will be established momentarily to control the respective registering wheel of the tabulating apparatus. The means shown for controlling the circuit is substantially that indicated in Letters Patent 945,236 issued to me January 4, 1910, and hence further description thereof is unnecessary.

The index-point positions of the respective columns of group 5 are successively presented to contact brushes 22 and their respective contact plates 23 which control means for stopping the apparatus. So far as concerns contacts 22—23, the index-points of column 5 are in control thereof, while the index-points of column 4 control the contacts 20—21.

Figure 1:
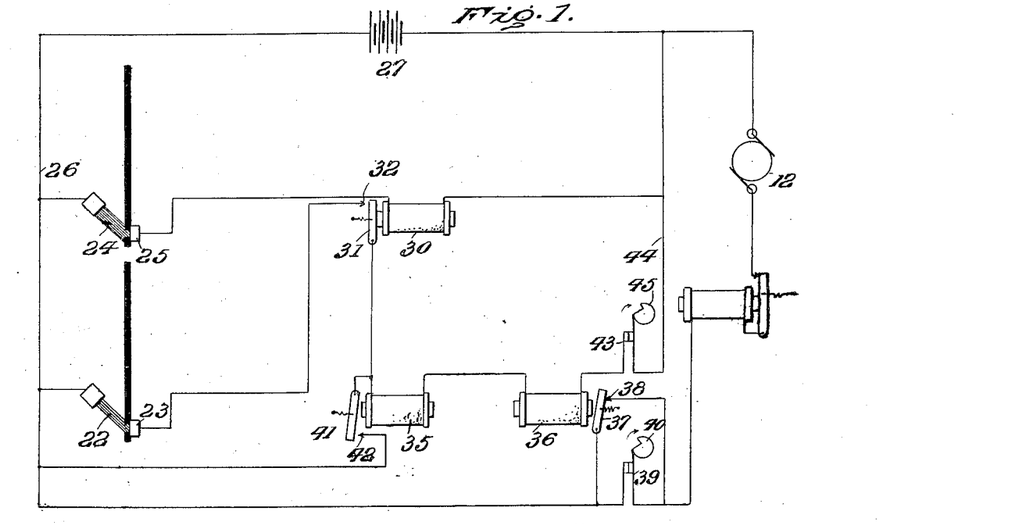
Fig. 1 is a diagrammatic view in elevation showing the parts in the position they occupy in the normal operation of the apparatus, with two cards in position both belonging to the same series.
Figure 2:
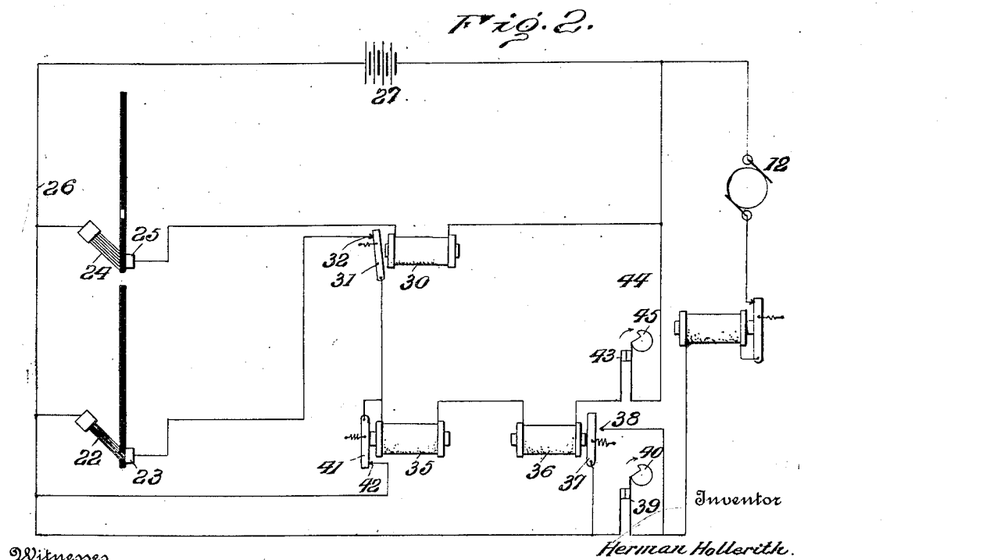
Fig. 2 is a similar view showing the parts in position to stop the operation of the apparatus, with two cards in position belonging to different series.
Figure 3:
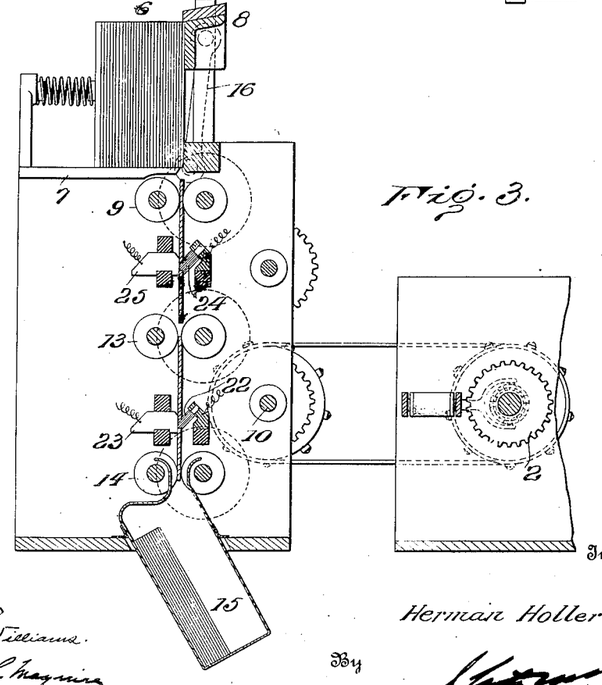
Fig. 3 is a vertical longitudinal sectional view, with parts broken away, showing a portion of the tabulating apparatus.

The record-cards in addition to controlling the record-actuated contacts 20—21 and 22—23 also control a series of record-actuated contacts composed of brushes 24 and contact-plates 25 to which are presented the same index-point positions by which the contacts 22—23 are controlled, namely, in the selected illustration, the columns of the "account" group 5. These contacts 24—25 are in the path of the record-cards in their passage through the apparatus; they are shown in Figs. 1, 2 and 3 as located above the before described record-actuated contacts and between the upper feed-rollers 9, and the intermediate feed-rollers 13, while the record-actuated contacts 20—21 and 22—23 are between the latter feed-rollers and the lower feed-rollers 14. The purpose of this supplemental series of record-actuated contacts 24—25 is to insure the apparatus remaining in operation while record-cards of the same series are passing through it and to allow the apparatus to automatically stop when cards of a different series are brought into position to control the record-actuated contacts. The contacts 24—25 are adapted to sense the designation of the cards and when such sensing means detects a change in the designation the means for feeding the cards through the apparatus will be brought to a stop.

Referring now to the diagram, Fig. 1, which shows a single set of record-controlled contacts of each of the two series, the contact brushes 22 and 24 are connected to one line of the main operating circuit 26 which includes a generator 27 and the motor 12. The contact plate 25 is connected to a relay magnet 30 which latter is connected to the other line of the main circuit. When the circuit is closed through brush 24 and contact plate 25 the armature 31 of relay magnet 30 will be drawn away from contact 32 with which it is normally in engagement. This contact 32 is connected to the corresponding contact plate 23 of the other series of record-controlled contacts, that is, the series common to the same index-point positions as the contacts 24—25. The armature 31 is connected to a control magnet 35, which in turn is connected to a relay magnet 36, the armature 37 of which is connected to the main circuit and is normally in engagement with a contact 38 of a branch of such main circuit which bridges contacts 39 therein. The latter are arranged to be separated to break the main circuit by a constantly-revolving cam 40. The armature 41 of control magnet 35 is connected with magnet 36 and is shown in series with magnet 35 and connected to armature 31. When magnet 35 is energized by the passing of current through contact point 32 and armature 31 the armature 41 will engage contact 42 connected to the main circuit and the current will then pass from armature 41 through magnet 35 to the magnet 36, armature 41 remaining in such engagement until magnet 35 is de-energized, in a manner to be hereinafter described, so as not to break the operating circuit when contact between brush 22 and contact plate 23 is interrupted by passage of the punched portion of the card from these contact points.

If contact is had concurrently by corresponding brushes 22 and 24 through correspondingly-punched holes in corresponding columns of two record-cards of a common series no circuit will be established between brush 22 and its contact plate 23, for that, synchronously with, or just immediately preceding, the presentation of the punched hole of the forward card to the brush and contact 22—23 the circuit is closed through the corresponding brush and contact 24—25 in time for the magnet 30 to draw its armature 31 from contact 32, and hence the machine will continue in operation.

If, however, as shown diagrammatically in Fig. 2, the punched holes do not correspond, as when the record-cards presented to the two series of contacts belong to different card series, (as represented by the index-point positions in column 5 in the selected illustration) with the result that contact will not exist synchronously between corresponding brushes and their respective contact plates, the armature 31 will be in engagement with contact 32 when the circuit is closed through brush and contact 22—23, resulting in energizing magnets 35 and 36 and the breaking of the main circuit at contact 38. The main circuit will not, however, be completely opened until contacts 39 are separated, and this is arranged to occur at a predetermined point in the operation of the apparatus, namely, during the interval following the passage of one, and the entrance of a succeeding card, into control position between the brushes and contacts 22—23. The magnet 35 will maintain its control over armature 41 until the circuit through such magnet is broken. For this purpose I employ two contacts 43 in conductor 44 between magnet 36 and the main circuit, and these contacts are arranged to be separated by a constantly revolving cam 45, which performs its function simultaneously with, or immediately following, the action of the cam 40. When contacts 43 are separated control magnet 35 is de-energized and its armature 41 released.

The brushes 24 are preferably made wider than the lower brushes 22 so that when two record-cards similarly punched are moving between the brushes and their contact plates the brushes 24 will make contact before, and break contact after, the brushes 22, thus providing for any irregularity in punching.

From what has been said it will be understood that when the circuit is closed through contacts 24, 25 the motor circuit will not be broken, and this is true whether or not any of the lower brushes 22 are in contact with their respective plates 23. If any one of the brushes 22 makes contact with its respective plate 23 and the circuit is not at the same time closed through the corresponding brush and contact 24—25 the magnets 35 and 36 will be energized and the motor circuit broken. If the cards passing through are similarly punched, that is, of a common series, the machine will continue to run, and if no card is between the contacts 24—25, as when the last card of a series has passed to the contacts 22—23, the machine will continue in operation until such last card passes from control position relative to such latter contacts. The main circuit will then open through the disengagement of card-controlled contacts 50 (Fig. 5), when such card moves out of engagement with contact-controlling lever 51 after the manner disclosed in my before noted Patent No. 945,236. This permits the tabulation of the last card of each series.

Any suitable means may be employed for automatically engaging and disengaging the main operating shaft 10 from the motor. I have shown for this purpose a clutch sleeve 55 splined on shaft 10 and having on one side squared teeth for engaging corresponding teeth of a disc 56 on the motor shaft, said sleeve being shiftable longitudinally of the shaft by a spring-held lever 57 which forms the armature of a magnet 58 in the main circuit so that when the latter is closed lever 57 will shift the clutch to couple shaft 10 to the motor. For the purpose of arresting shaft 10 at the proper point, a single tooth 60 of the clutch is designed to engage a fixed stop or tooth 61, such engagement occurring after the main circuit is opened and the last card of a series has passed through the apparatus.

The electric circuit, as shown in Fig. 5, comprises, in addition to the motor and generator, suitable magnets and relays and starting and stopping contacts not necessary here to be described. In this figure the lowermost magnet 30 is shown in the same position as in Figure 1. The energizing of this magnet and the withdrawal of the armature 31 from contact 32 are caused by the simultaneous presentation of similarly punched holes in the record-cards to the contacts 24—25 and 22—23. When this condition exists the magnet 30 is energized slightly in advance of the engagement between contact 22—23 (the brushes 24, as before described, being wider than the brushes 22) with the result that the machine will continue to run, the mechanism actuated through the control magnet 35 and relay magnet 36 being unaffected. If, however, the punched holes of the cards successively presented to the contacts 24—25 and 22—23 are not similar, the circuit will be established between the contacts 22 of one lead, and the contact plates 23, armature 31, control magnet 35, contacts 43 and relay magnet 36 of the other lead, with the following result: Control magnet 35 will be energized, drawing its armature 41 into engagement with contact 42 and the energization of relay magnet 36 will effect the disengagement of the armature 37 from contact 38, the circuit being broken through contacts 39 by the revolving cam 40 which will effect the stopping of the motor. The control magnet 35 and the relay magnet 36 will be de-energized by the breaking of the contacts 43 effected by the revolving cam 45.

While for the purpose of illustrating and clearly describing my invention, I have selected certain specific means and forms of apparatus in which it is embodied, it is to be understood that the same may be modified in many respects without departing from the principle or spirit of the invention as set forth in the claims.

Figure 7:
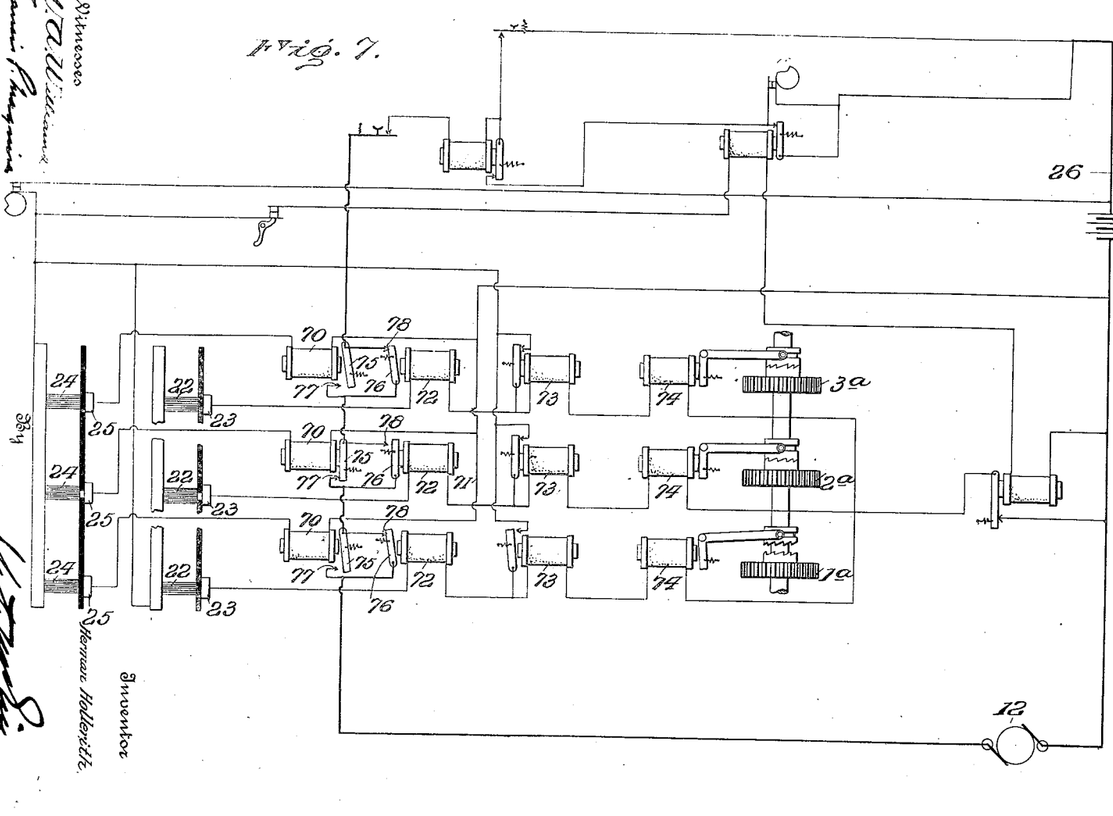
Fig. 7 is a diagrammatic plan view of a modified arrangement, the sets of contacts being offset for the sake of clearness.

According to the arrangement above described the means controlled by the two series of contacts 22—23 and 24—25 are located in secondary circuits and the main circuit normally remains unbroken, but according to the arrangement shown diagrammatically in Fig. 7 the controlling means is in the main circuit, and such means may control a separate register which will be operated as each card series comes into control position to indicate, in the selected illustration, the "account" number and which will remain unaltered while cards of a common series are passing through the machine, as specified in my before noted Patent No. 1,087,061.

In Fig. 7 the contact plates 25 are severally connected to relay magnets 70 which are connected by a common conductor 71 to one lead of the main circuit 26, while the co-acting brushes 24 are connected to the other lead of such circuit. The contact plates 23 are severally connected to relay magnets 72 which are connected to a register through relay magnets 73 and clutch magnets 74, gears 1a, 2a and 3a of the register only being shown. The brushes 22 are connected to the same lead of the main circuit as brushes 24, while the magnets of the register are connected to the opposite lead, as are contact plates 25 and magnets 70. The armatures 75 of relay magnets 70 and the armatures 76 of relay magnets 72 control the main circuit which may be closed through either series of armatures. Both series are in the main circuit in branch relation to each other. The armatures 75 are drawn into engagement with contacts 77 when magnets 70 are energized; the armatures 76 are normally in engagement with contacts 78, but drawn therefrom when magnets 72 are energized. If either armature is in engagement with its respective contact the circuit is maintained, but if both armatures are out of engagement with such contacts the circuit is opened. Normally the circuit is maintained through armature 76 and open through armature 75. If companion magnets 70 and 72 are synchronously energized by the closing of the circuits through correspondingly punched holes in two cards of a common series being presented to the respective contacts, the main circuit is maintained through armature 75 and contact 77 and is broken through armature 76 and contact 78. On the other hand, if the circuit be closed through a brush 22 and its plate 23, and at the same time the circuit is not closed through the corresponding brush and contact plate of the series 24—25, then the main circuit is broken when armature 76 is disengaged from contact 78, since armature 75 was not drawn to contact 77. In this way the operation of the machine will be automatically stopped when different records represented by dissimilarly punched cards, are presented to the two series of record-actuated contacts. As long as correspondingly punched cards, that is, cards having the same index-points in the column 5, are in control the main circuit will be maintained, but when cards belonging to different series are in position to control the main circuit will be opened.

I have not thought it necessary to describe the details of the tabulator or register shown in Fig. 7 as they constitute no part of my present invention; and likewise I have not deemed it necessary to either show or describe means whereby the particular register shown in this figure may be automatically thrown out of operation at the completion of a cycle of operation, since this idea together with the means for carrying it out is fully disclosed in my before noted Patent No. 1,087,061.

I claim as my invention:

1. In an apparatus of the character described, the combination with record-cards having index-points, of a record-actuated register, and means under the concurrent control of a plurality of such record-cards for maintaining the normal operation of the register and stopping such operation in the event of any difference in the effective control of such record-cards.

2. In an apparatus of the character described, the combination with record-cards having groups of index-points, of a register controlled by one group of index-points, and means concurrently controlled by another group of index-points of a plurality of record-cards for normally maintaining the operation of such register and for automatically discontinuing such operation when such latter index-points do not correspond.

3. In an apparatus of the character described, the combination with record-cards arranged in series and having each, index-points arranged in groups, of a register controlled by the index-points of one group, and means controlled by another group of index-points for rendering the register inoperative after the termination of each series of record-cards, such last mentioned means functioning simultaneously with the control of the register by the index points of the first group.

4. In an apparatus of the character described, the combination with record-cards arranged in series and having each index-points arranged in groups, and means for feeding the record-cards through the apparatus, of a register controlled by the index-points of one group, means controlled by another group of index-points for rendering the register inoperative, and record card controlled means for normally rendering the last mentioned means ineffective during the passage of cards of a common series.

5. In an apparatus of the character described, the combination with record-cards arranged in series and having each index-points arranged in groups, and means for feeding the record-cards through the apparatus, of a register controlled by the index-points of one group, means controlled by another group of index-points for rendering the register inoperative, and means also controlled by the latter group of index-points for normally rendering the last mentioned means ineffective during the passage of cards of a common series.

6. In an apparatus of the character described, the combination with record-cards having index-points, of a record-actuated register, and devices simultaneously controlled by a plurality of record cards for detecting record group changes, including means controlled by the index-point of a card for stopping the register, and means controlled by a corresponding index-point of another card for normally preventing the last mentioned means from being effective.

7. In an apparatus of the character described, the combination with record-cards having index-points, of a record-actuated register, means controlled by corresponding index-points of two cards simultaneously presented to such control means, such means through the index-point of one card serving to throw out the register and through a corresponding index-point of the other card to maintain the register.

8. In a tabulating machine, the combination with record-cards having index-points, of an electric circuit, record-actuated means for opening said circuit, and record-actuated means for preventing said first mentioned means from being effective.

9. In an apparatus of the character described, the combination with record-cards having index-points, of a record-actuated register, an operating circuit therefor, record-actuated means for opening said circuit, and record-actuated means for normally preventing the first mentioned means from being effective.

10. In a tabulating machine, the combination with record-cards, having index-points, of an electric circuit, means controlled by the index-point of a card for opening said circuit, and means controlled by the index-point of another card for preventing said last mentioned means from being effective.

11. In a tabulating machine, the combination with record-cards having index-points, of an electric circuit, record-actuated means for opening said circuit, record-actuated means for preventing said first mentioned means from being effective, and means controlled by said circuit for feeding the record-cards.

12. In an apparatus of the character described, the combination with record-cards having index-points, of a record-actuated register, an operating circuit therefor, record-actuated means for opening said circuit, record-actuated means for preventing said first mentioned means from being effective, and means controlled by said circuit for feeding the record-cards.

13. In an apparatus of the character described, the combination with record-cards, of a record-actuated register, an operating circuit therefor, contacts for opening said circuit through the instrumentality of one card, and contacts controlled by another card for preventing the first-mentioned contacts from being effective.

14. In an apparatus of the character described, the combination with record-cards having index-points, of a record-actuated register, an operating circuit therefor, record-actuated contacts for opening said circuit through index-points of one card, and record-actuated contacts controlled by corresponding index-points of another card for preventing the first-mentioned contacts from being effective.

15. In a tabulating machine, the combination with a record-card having index-points, of an electric circuit, an electro-magnet in said circuit, means controlled by the index-points for opening said circuit, and means controlled by the same index-points for controlling said magnet to prevent said circuit being opened.

16. In a tabulating machine, the combination with a record-card having index-points, an electric circuit, an electro-magnet in said circuit, two series of contacts controlled by corresponding index-points, one series of contacts effecting the opening of said circuit, and the other series of contacts controlling said magnet to prevent said circuit being opened.

17. In an apparatus of the character described, the combination with record-cards having index-points, of an electric circuit, a record-actuated register in said circuit, record-actuated means for opening said circuit, record actuated means for normally preventing the first-mentioned means from being effective, and means for temporarily maintaining said circuit after it has been opened.

18. In an apparatus of the character described, the combination with record-cards having index-points, of an electric circuit, a record-actuated register in said circuit, record-actuated means for opening said circuit comprising electro-magnets, a branch circuit in which said electro-magnets are located, record-actuated means for normally preventing the first-mentioned means from being effective, and means for temporarily maintaining the main circuit around the record-actuated means by which said circuit is opened.

19. In an apparatus of the character described, the combination with record-cards having index-points, of means for successively feeding said cards, a record-actuated register, an electric circuit including said register and feeding means, record-actuated means for opening said circuit and arresting said feeding means, and record-actuated means for preventing the first mentioned record-actuated means from being effective.

20. In an apparatus of the character described, the combination with record-cards having index-points, of an electric circuit, a record-actuated register in said circuit, record-actuated means for opening said circuit, comprising electro-magnets, record-actuated means for normally preventing the first-mentioned means from being effective, and means for releasing the circuit through said magnets.

21. In an apparatus of the character described, the combination with record-cards having index-points, of an electric circuit, a record-actuated register in said circuit, record-actuated means for opening said circuit comprising electro-magnets, record-actuated means for normally preventing the first-mentioned means from being effective, a branch circuit in which said electro-magnets are located, and means controlling the branch circuit to release the magnet control.

22. In a tabulating machine, tabulating devices controlled by record-cards, devices for feeding the cards thereto, and devices controlled solely by the characteristics of the record cards themselves for detecting record group changes and synchronously interrupting the operation of the feeding mechanism.

23. In a device of the character described, the combination with an accounting machine having designation sensing means, of tabulating means, means for feeding the cards from said sensing means to said tabulating means, means for discharging the cards from said tabulating means, and disconnecting means for stopping the operation of the feeding means from said sensing means.

24. In a device of the character described, the combination with an accounting machine having designation sensing means, of tabulating means, means for feeding the cards from said sensing means to said tabulating means, means for discharging the cards from said tabulating means, and disconnecting means connected to said sensing means to be operated thereby for stopping the operation of the feeding means from said sensing means.

25. In a tabulating machine, tabulating devices controlled by record cards, means for successively feeding the cards thereto, and mechanism automatically controlled through the index points of a record card fed to said tabulating devices for comparing the card in process of tabulation with the next following card and interrupting the operation of the machine when such cards are unlike.

26. In an apparatus of the character described, the combination with record cards arranged in series, means to bring the first card of a series to tabulating position, means directly controlled by the card tabulated for comparing the next following card with the card tabulated, and means for interrupting the operation of the machine when these two cards disagree.

27. In a tabulating machine, tabulating devices controlled by record cards, feeding means for placing two cards in comparing position, and means for comparing such cards and interrupting the operation of the machine when such cards are unlike.

28. In a tabulating machine, the combination with record cards having groups of index points, feeding means for placing two cards in comparing position, and means for comparing one group of one card with the similar group of another card and interrupting the operation of the machine when such groups are unlike.

29. In combination, a card feeding device for feeding cards successively from a pile, and means cooperating successively with the cards in said pile and controlled by punchings in said cards for causing said card feeding device to intermit its feeding action when a card having different controlling punchings from the preceding card is reached.

30. In combination, discharge mechanism, a card supplying device for feeding cards to said discharge mechanism, and means cooperating successively with the cards supplied from said card supplying device to said discharge mechanism and controlled by punchings in said cards for intermitting the supply of cards from said card supplying device to said discharge mechanism when a card is reached having different controlling punchings from those in the preceding card.

31. In a machine of the class described the combination of perforated-card-controlled mechanism and a finder comprising a group of members which take advanced or retracted positions according as corresponding spaces on the card are perforated or imperforate, and means for causing a regular operation of the machine only when said members take the same position under control of a card which they took under control of the previous card.

32. In a machine of the class described the combination of perforated-card-controlled mechanism, means for feeding cards in succession to operative position and a finder adapted to cause a stoppage of the feed when a card perforated according to a new class arrives at the operative position.

33. In a machine of the class described the combination of perforated-card-controlled mechanism, means for feeding cards in succession to operative position and a finder adapted to cause a stoppage of the machine when a card perforated according to a new class arrives.

34. In a machine of the class described the combination of perforated-card-controlled mechanism, means for feeding cards in succession to operative position and a finder adapted to cause a stoppage of the feed when a card perforated according to a new class arrives at the operative position, said finder adapted to automatically assume a plurality of operative positions corresponding to a plurality of classes.

35. In a machine of the class described the combination of perforated-card-controlled mechanism, means for feeding cards in succession to operative position and a finder adapted to cause a stoppage of the machine when a card perforated according to a new class arrives, said finder adapted to automatically assume a plurality of operative positions corresponding to a plurality of classes.

36. In combination, discharge mechanism, a control member, a feeding device for feeding cards to and from the control member and to the discharge mechanism, and means controlled by each card fed to the control member for selectively determining whether the feeding device shall at once feed said card from the control member to the discharge mechanism or not.

37. In combination, a control member, a feeding device for feeding cards to and from such control member, and means controlled by each card fed to the control member for determining whether such card shall be fed from the control member immediately or subsequently.

38. In combination, a discharge mechanism, a control member, a feeding device for feeding cards from the control member to the discharge mechanism, and means cooperating with each card supplied to the control member for determining whether such card shall be fed to the discharge mechanism immediately or subsequently.

39. In combination, a card-feeding device for feeding cards successively from a pile, and means cooperating successively with the cards from said pile for selectively determining whether said card feeding device shall continue or intermit its feeding action of cards from such pile.

40. In combination, a discharge mechanism, a card-supplying device for supplying cards to said discharge mechanism, a feeding device for feeding cards successively from said card-supplying device to said discharge mechanism, and means cooperating with the successive cards from said card-supplying device for controlling said feeding device.

41. In combination, a control member, a feeding device for feeding cards successively from a pile to the control member and then off the control member, and means controlled by the action of the cards which pass on to the control member for selectively determining whether the feeding device shall continue or intermit its aforesaid feeding action.

42. In combination, discharge mechanism, a card-supplying device, a feeding device for feeding cards from said card-supplying device to said discharge mechanism, and means cooperating successively with the cards from said card-supplying device for causing an intermitting of the action of the feeding device on the cards from said card-supplying device when a card is reached which differs in any controlling respect from the preceding card.

43. In an apparatus of the character described, the combination of an analyzer; a feeding means therefor; an actuator therefor; and means operated by the analyzer for causing the actuating means to lock the feeding means.

44. In an apparatus of the character described, the combination of an analyzer; an analyzer feeding means; an analyzer actuating means; means for locking said feeding means; a sensing means operated by said analyzer; and means operated by the sensing means for causing said locking means to engage the actuating means for bringing about the locking of the feeding means.

45. In an apparatus of the character described, the combination of an analyzer; feeding means for feeding cards to the analyzer; and a locking means for locking the feeding means.

46. In an apparatus of the character described, the combination of an analyzer; feeding means for feeding control-means to the analyzer; and a locking means adapted to be actuated by said analyzer for locking the feeding means.

47. In a machine of the class described, means for feeding records, means for sensing data on such records, and means controlled by said sensing means for controlling said feeding means.

48. In a machine of the class described, means for feeding records, means for sensing data on said records, said means including designation sensing elements, and means controlled by said elements for interrupting the normal operation of the machine when a record having a different designation is sensed by said elements.

49. In a machine of the class described, means for feeding perforated records, means for sensing designation numbers in the form of perforations in successively presented records, and means controlled by said sensing means for interrupting the normal operation of said feeding means when a record having a different designation number from a previous record is sensed.

50. In a machine of the class described, means for sensing data on successively presented records, said means including designation sensing elements and means controlled by said elements for interrupting the normal operation of the machine when a record having a different designation is sensed by said elements.

51. An automatic control system for a record controlled machine comprising analyzing mechanism for searching index point designations on controlling records while the latter are in motion and means controlled by said mechanism for controlling the machine operation in accordance with like and unlike designations on successive records.

In testimony whereof, I have signed this specification.

HERMAN HOLLERITH.